March 25, 1930.     W. MARSHALL     1,751,828
VEHICLE BODY CONSTRUCTION
Filed May 11, 1925     2 Sheets-Sheet 1
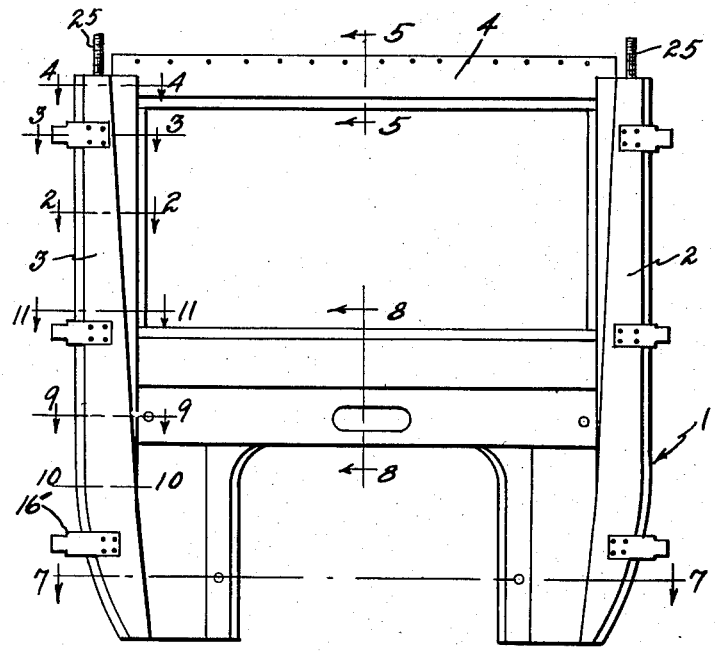
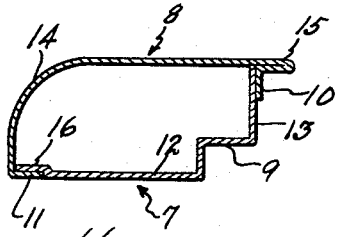
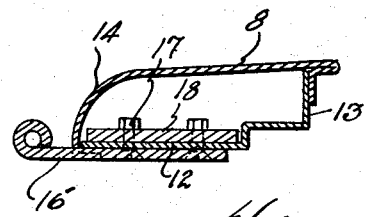
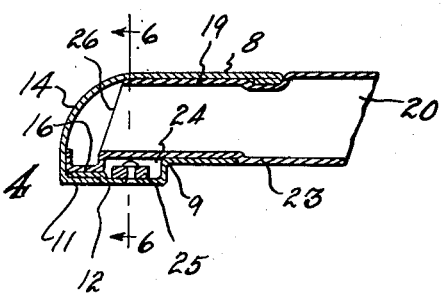
INVENTOR.
WILLIAM MARSHALL.
BY
ATTORNEYS

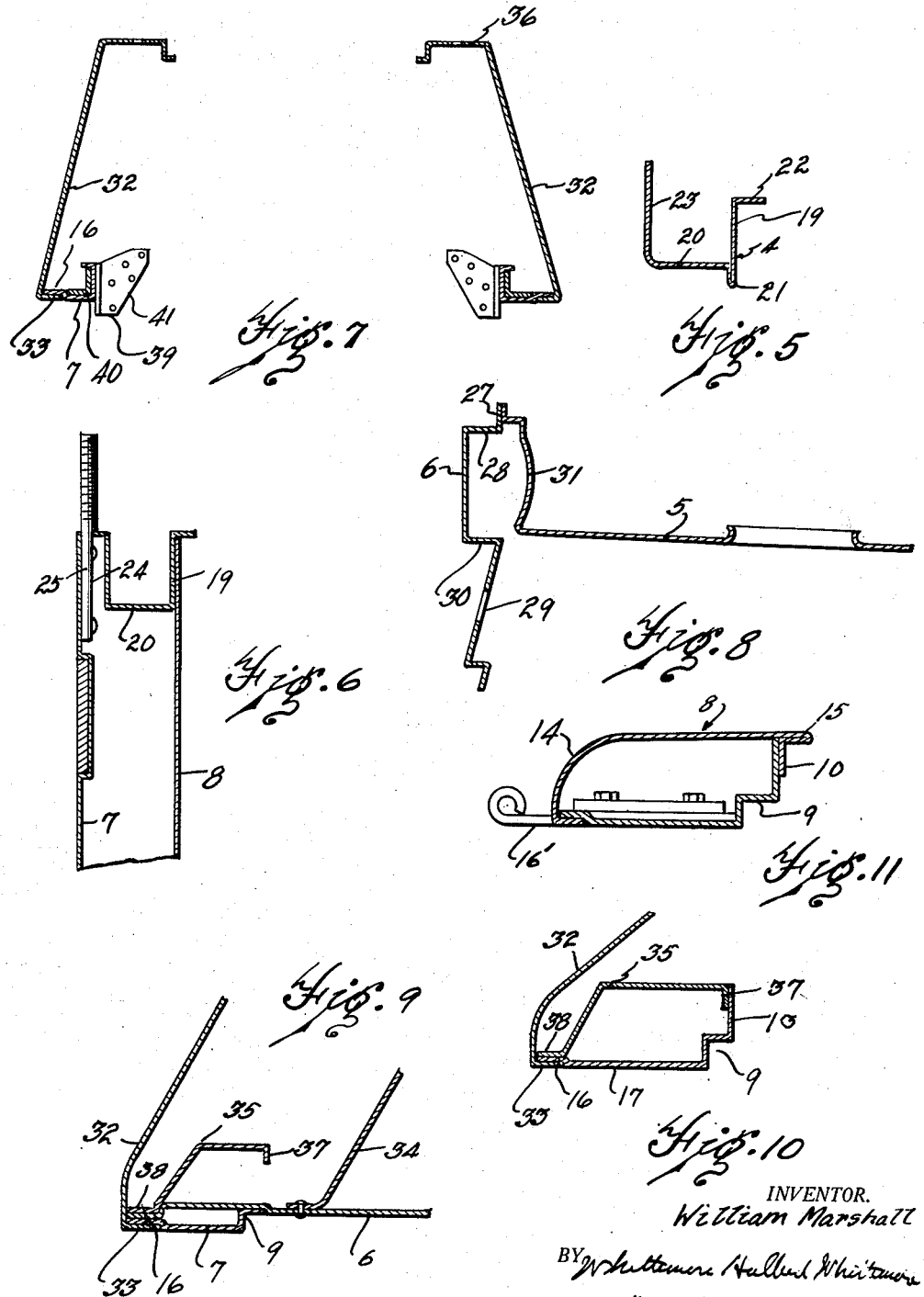

Patented Mar. 25, 1930

1,751,828

UNITED STATES PATENT OFFICE

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN

VEHICLE BODY CONSTRUCTION

Application filed May 11, 1925. Serial No. 29,602.

This invention relates to vehicle bodies, particularly to the front end construction thereof, and consists of certain novel features of construction, combinations and arrangements of parts as will be more fully described and particularly pointed out in the appended claims.

In the accompanying drawings:

Figure 1 is a rear elevation of the front end construction.

Figure 2 is a sectional view taken on the line 2—2 of Figure 1.

Figure 3 is a sectional view taken on the line 3—3 of Figure 1.

Figure 4 is a fragmentary sectional view taken on the line 4—4 of Figure 1.

Figure 5 is a sectional view taken on the line 5—5 of Figure 1.

Figure 6 is a sectional view taken on the line 6—6 of Figure 4.

Figure 7 is a sectional view taken on the line 7—7 of Figure 1.

Figure 8 is a sectional view taken on the line 8—8 of Figure 1.

Figure 9 is a fragmentary perspective view taken on the line 9—9 of Figure 1.

Figure 10 is a fragmentary sectional view taken on the line 10—10 of Figure 1.

Figure 11 is a sectional view taken on the line 11—11 of Figure 1.

Referring now to the drawings, numeral 1 designates the front end of a vehicle body of the closed type having the front pillars 2 and 3 respectively, windshield header 4, cowl 5 and instrument panel 6. To facilitate assembly, these parts are preferably prefashioned and may be rigidly secured together by any suitable means to form an integrated unit. In the construction disclosed these parts are preferably welded together.

As shown, each pillar is curved longitudinally to conform to the curvature of the vehicle body and is preferably formed of two sections 7 and 8 respectively which are constructed of light gauge sheet metal. The inner section 7 of each pillar is substantially L-shaped in cross section and is preferably provided at the inner rear edge thereof with a substantially L-shaped rabbet 9 that serves to stiffen and reinforce the same, while the outer section 8 is also substantially L-shaped in cross section and is provided at its inner and outer edges with the laterally extending flanges 10 and 11 respectively that are preferably welded to the inner and rear walls 12 and 13 respectively of the inner section 7. To provide a neat appearance, the outer section 8 is preferably rounded as shown at 14 and is provided at its inner edge with the close return bent portion 15 that connects into the lateral flange 10 and cooperates therewith to form a suitable rabbet for receiving a side edge of the usual windshield (not shown). The rear wall 12 of the inner section is also preferably provided at its outer edge with a suitable offset portion 16 for receiving the flange 11 of the outer section so as to provide a smooth finish. Any suitable means such as the hinge sections 16' may be mounted upon the rear walls 12 of the inner section 7 to support the usual swinging doors (not shown) of the vehicle body. These hinge sections 16' may be secured to the pillars by any suitable means such as the bolts 17 which preferably extend through the inner sections 7 and engage the reinforcing plates 18 upon the rear walls 12 of the inner sections.

The header 4 is also constructed of light gauge sheet metal and is preferably substantially U-shape in cross section. As shown in Figure 5 of the drawings, the front wall 19 of the header projects below the base 20 of the channel to form an abutment 21 for the usual windshield (not shown) and is provided at its upper edge with a forwardly projecting flange 22 that is adapted to be secured to the lower face of the front rail (not shown) of the vehicle top, while the rear wall 23 preferably projects slightly above the front wall 19 and is adapted to be secured to the rear face of the front rail of the top. To provide a neat as well as rigid construction, the inner walls 13 of the pillars are preferably cut away to receive the header. As shown in Figure 4 of the drawings, the walls 19 and 23 respectively of the header are preferably offset inwardly and are welded to the sections 7 and 8 respectively of each pillar. Thus, the header 4 will materially stiffen and reinforce the pillars. Inasmuch as the inner sections 7 of the pillars are provided with the rabbets 9 and the rear wall 23 of the header is offset inwardly opposite to these rabbets, suitable pockets 24 are formed in the pillars to receive the usual top irons 25 by which the top (not shown) of the vehicle may be secured to the pillars. It will also be noted that the base 20 of the channel header 4 is preferably cut away at its opposite ends as shown at 26 to permit electric light wires (not shown) to be dropped down the pillars for connection with suitable lights (not shown) upon the cowl.

The instrument panel 6 may be constructed of any suitable material and may be any shape desired. As shown, this panel 6 is preferably provided with a channel-shaped portion having an upstanding flange 27 at the forward edge of the upper wall 28 of the channel and having a depending rearwardly inclined apron 29 at the forward edge of the lower wall 30.

The cowl 5 may be any shape desired and may be secured by any suitable means to the instrument panel 6. As shown, the cowl 5 is preferably inverted U-shape and is provided at its rear end with an upstanding belt 31 that is preferably welded at its upper edges to the upstanding flange 27 of the instrument panel.

To provide a neat as well as a strong and durable connection between the pillars 2 and 3 respectively, cowl 5 and instrument panel 6, the side walls 32 of the cowl are preferably provided at their rear edges with inwardly extending flanges 33 that are preferably welded to the offset portions 16 of the inner sections 7 of the pillars, while the instrument panel 6 is preferably welded to the inner flanges of the rabbets 9 at the inner edges of the inner sections 7 and are also preferably welded to the offset portions 16. Any suitable means such as the horizontal brace iron 34 and the vertical angle members 35 may be used to reinforce the construction. As shown, the brace 34 is preferably a narrow strip of metal and is provided at its opposite ends with laterally offset portions that are rigidly secured to the instrument panel 6 and front wall 36 of the cowl 5. The angle member 35 is preferably formed of sheet metal and is provided at its inner and outer edges with the lateral attaching flanges 37 and 38 respectively. The outer flange 38 is preferably welded at the instrument panel 6, while the inner flange 37 is preferably welded to the inner wall 13 of the pillar section 7 above and below the instrument panel 6. Thus, the angular reinforcing member 35 cooperates with the walls 12 and 13 respectively of the inner section 7 of each pillar to form tubes which will take up any weaving or twisting action to which the construction may be subjected while in use.

Any suitable means such as the angular anchor irons 39 may be employed for connecting the pillars 2 and 3 respectively to the usual sills (not shown) of the vehicle body. The vertical portions 40 of these irons are preferably L-shape in cross section and are secured to the walls 12 and 13 respectively of the inner sections 7 of the pillars, while the base portions 41 preferably project inwardly from the vertical portions 40 immediately below the lower ends of the pillars and are provided with suitable holes for receiving the bolts or other securing elements used to attach the pillars to the body sills.

Thus, from the foregoing description, it will be readily apparent that the parts forming the front end construction may be easily and quickly assembled to form integrated units which in turn may be readily secured to other parts to form the complete vehicle body. Inasmuch as the parts of the front end construction are welded together and are effectively reinforced and braced, it will also be apparent that minimum rigidity is obtained. Furthermore the parts are formed entirely of metal, hence it is possible to obtain uniformity of design as well as durability. It will also be noted that the outer sections 8 of the pillars are cut away from the instrument panel 6 to the braces 39, hence a material saving of metal is effected.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a front end construction for vehicle bodies, the combination with a pillar having an inner section, of an instrument panel secured to the front face of the inner section, a cowl having a flange secured to the rear face of the inner section, and a brace extending between and secured to said instrument panel and cowl.

2. A pillar for vehicle bodies comprising an inner section, and an outer section, the inner section being substantially L-shape in cross section, and the outer section being substantially L-shape in cross section, the outer wall of the outer section having a flange secured to the rear wall of the inner section, and the front wall of the outer section having a return bent portion projecting inwardly beyond the inner wall of the inner section and terminating in a lateral flange secured to the inner wall of the inner section.

3. A vehicle body construction comprising a pillar having spaced front and rear walls, an inwardly offset rabbet at the inner edge of the rear wall, and a channel-shaped header extending between said front and rear walls, the rear wall of the header having a portion cooperating with a portion of the pillar adjacent to the rabbet to form a vertical pocket for receiving a top iron.

4. A vehicle body construction comprising a pillar having an inner section, the rear face of the inner section having an offset portion at its edge, an instrument panel secured to the front face of the inner section, a cowl having a flange secured to the offset portion aforesaid, and an angular reinforcing member having lateral flanges secured respectively to said pillar and instrument panel.

5. A vehicle body construction comprising a pillar having a section of substantially L-shaped in cross section, an instrument panel having an offset portion at one edge secured to one wall of the L-shaped section, an angular reinforcing member having a lateral flange at one edge secured in said offset portion and a lateral flange at the other edge secured to another of said walls, and a brace secured to said instrument panel.

6. In a front end construction for vehicle bodies, the combination with a pillar having an inner section, of an instrument panel secured to the front face of the inner section, a cowl having a flange secured to the rear face of the inner section and a reinforcing member having a portion secured to said instrument panel and another portion secured to said pillar above and below said instrument panel.

7. In a front end construction for vehicle bodies, the combination with a pillar having an inner section, of an instrument panel secured to the front face of the inner section, a cowl having a flange secured to the rear face of the inner section, a reinforcing member having a portion secured to the instrument panel and another portion secured to the pillar, and a brace extending between and secured to said instrument panel and cowl.

8. A vehicle body construction comprising a pillar having connecting walls extending at substantially right angles to each other, a cowl having a flange secured to the rear face of one of said walls, a reinforcing member having a portion secured to the opposite face of said last mentioned wall in substantial alignment with the flange on said cowl and having another portion secured to the other of said walls.

9. In a front end construction for vehicle bodies, the combination with a pillar having an inner section, of an instrument board and cowl secured upon opposite sides of the inner section adjacent one edge thereof.

10. In a front end construction for vehicle bodies, the combination with a pillar having an inner section, of a cowl having a flange secured to the outer side of the inner section, an instrument board and reinforcing member having portions secured to the opposite side of said inner section in substantial alignment with the flange aforesaid.

11. In a front end construction for vehicle bodies, the combination with a pillar having an inner section, of an instrument board and a reinforcing member having portions secured respectively to one side of one of the inner sections aforesaid, and a cowl having portions overlapping and concealing the connections between said instrument board, reinforcing member and inner section, one portion of said cowl being secured to a portion of said pillar.

In testimony whereof I affix my signature.

WILLIAM MARSHALL.